Figure 1:
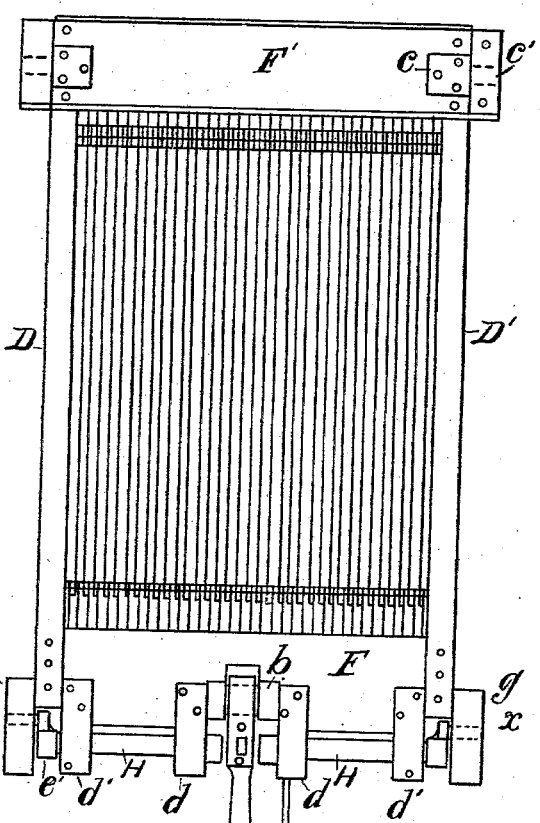

(No Model.)

A. RODGERS.
RECIPROCATING SAW MILL.

No. 324,273. Patented Aug. 11, 1885.

2 Sheets—Sheet 1.

WITNESSES
G. Burroughs
D. Miller

INVENTOR
Alexander Rodgers
By
E. J. Chandler,
Attorney (No Model.)

A. RODGERS.
RECIPROCATING SAW MILL.

No. 324,273. Patented Aug. 11, 1885.

2 Sheets—Sheet 2.

WITNESSES
G. W. Burroughs
A. Willenbucher

INVENTOR
Alexander Rodgers
By
E. J. Chandler,
Attorney

UNITED STATES PATENT OFFICE.

ALEXANDER RODGERS, OF MUSKEGON, MICHIGAN.

RECIPROCATING-SAW MILL.

SPECIFICATION forming part of Letters Patent No. 324,273, dated August 11, 1885.

Application filed April 27, 1885. (No model.)

*To all whom it may concern:*

Be it known that I, ALEXANDER RODGERS, a citizen of the United States, residing at Muskegon, in the county of Muskegon and State of Michigan, have invented certain new and useful Improvements in Gang-Saw Mills, of which the following is a specification, reference being had to the accompanying drawings.

This invention relates to an improvement in the devices employed for giving to saw-gates the necessary retrograde or backward movement required to relieve the saws during their upstroke in consequence of the general use of a steady instead of an intermittent feed in such mills. When the intermittent feed was employed, which was supposed to move the log only during the downstroke of the saws, the movement of the saw-gates was slow, seldom exceeding fifty strokes per minute, and the log could be stopped and started that number of times; but as it became desirable to increase the speed of the gates to as much as one hundred and fifty strokes per minute, it was found that at this speed the motion of the log was practically continuous, and as a result the teeth of the saw came in violent contact with the end of the saw-kerf at every upstroke. The first means employed to overcome this difficulty consisted in placing the saws in an inclined position in the gate, the top projecting, so as to give what was technically termed a "rake;" but this method of arranging the saws was found to be imperfect in its action, as when the feed was light only the upper teeth of the saw came into action, and their movement was of a chopping nature, instead of giving a drawing cut throughout the length of the stroke. The next improvement, which was a decided advance in the art, consisted in giving a swinging or oscillatory movement to the guides of the gate, causing the latter to retreat during its upward stroke and gradually advance as it came down, thus equalizing the labor upon the saw-teeth. The principal objections to this arrangement consist in the fact that owing to the tremendous strain upon the lower guides in large gang-mills it has been found almost impossible to hold these swinging movable guides in their proper line of travel for any length of time. I therefore propose to remedy this defect by using stationary guides, which can be firmly secured in place and produce the needed oscillation of the saw-gate by means of devices acting directly thereon, using the lower guides as a fulcrum for the levers, which produces the needed movement, all as will be hereinafter fully described.

Figure 3:
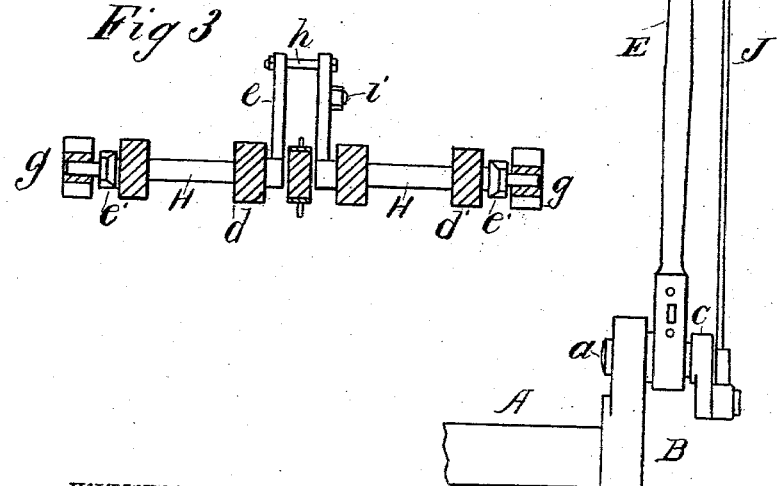
Figure 2:
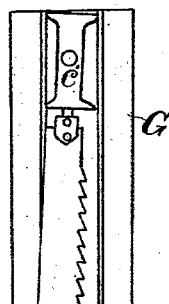
Figure 4:
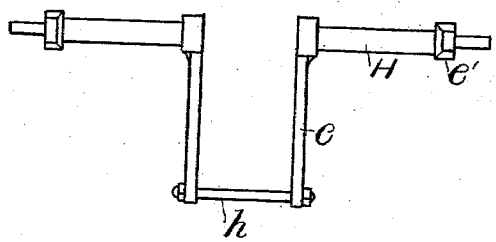
Figure 5:
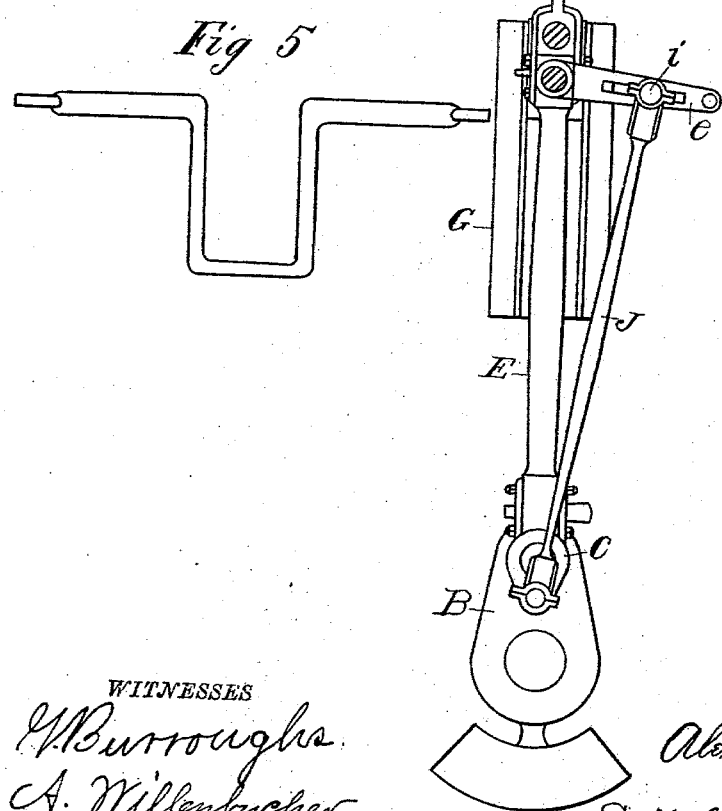

Figure 1 of the drawings is a front view of a gang-saw gate and its driving mechanism with my improvements attached. Fig. 2 is a vertical section of the gate, presenting a view of the driving mechanism and devices which oscillate the gate. Fig. 3 is a cross-section on line $x\,x$ of Fig. 1. Fig. 4 is a plan of the rock-shafts and cranks attached to the gate for the purpose of giving it its oscillatory motion. Fig. 5 shows a modification of rock-shafts, both of them together with the connections between being forged in a single piece.

In these several figures, A represents the crank-shaft; B, the driving-crank which gives the vertical movement to the saws, and C the reverse crank attached to the crank-pin $a$ of crank B, which reverse crank produces the oscillatory movement of the saw-gate. The vertical movement is given to the gate by crank B, through pitman E, which connects the crank-pin $a$ with the noddle-pin $b$ of the lower girt, F, of the gate. This gate is constructed in much the same manner as others now in use, consisting, essentially, of the two verticals or stiles D D' and upper and lower girts, F F', these parts being firmly secured together, so as to form a rectangular frame, within which are placed the saws $s$, arranged in the usual manner. Securely attached to the ends of the upper girt, F', are the trunnions $c\,c$, carrying the guide-blocks $c'\,c'$, which reciprocate in the upper guides, G, that are firmly secured to the mill-frame. It will be observed that the trunnions are journaled in these upper guide-blocks, thus allowing the gate to swing back and forth upon them. To the lower girt, F, are secured the journal-boxes $d\,d$ and $d'\,d'$, which carry the rock-shafts H H, journaled therein. To the inner ends of these rock-shafts are secured the slotted horizontal levers $e\,e$, and to their outer ends the short vertical crank-arms $e'\,e'$. To the pins of these short crank-arms are pivoted the lower guide-blocks, $g\,g$, which reciprocate in the lower guides, G'. The outer ends of the levers $e\,e$ are firmly connected by the cross-bar $h$, so that they, together with the rock-shafts, move synchronously. If desired, these rock-shafts, cranks, levers, and the connecting-bar may be forged in one piece, as shown in Fig. 5. In the slot of one of the levers $e$ is adjustably secured a crank-pin, $i$, which is connected with the crank-pin of the return-crank C by the pitman J. It will therefore be apparent that at each rotation of the shaft A, and consequent vertical reciprocation of the gate, the rock-shaft will be oscillated through the medium of the return-crank and pitman J, causing the lower end of the gate to move horizontally by reason of the pins of the short crank-arms $e'$ acting upon the fulcrum formed by the lower guide-blocks, $g$, thus giving to the lower end of the gate a swinging or oscillating movement upon the trunnions $c\ c$ as a center.

It will be observed that the upper guides, G, are not vertical, but are so inclined that as the saw-gate rises it is carried to the rear, and as it descends comes forward again. As this inclination is nearly equal to the throw of the short crank-arms $e'$ upon the ends of the rock-shafts, it follows that the saw-gate is carried up and down in nearly vertical lines, advancing as it descends and retreating as it goes up.

It will also be apparent that an eccentric might be placed on the crank B or on the shaft A, and connected with the rock-shaft by a pitman in the same manner as the return-crank, that would produce the same result as the devices heretofore described; but I prefer the arrangement shown in the drawings, as it is easily applied to cranks now in use, and its throw readily adjusted to suit the feed which it is intended to carry, instead of making such adjustment through the connection of the slotted rock-shaft, arm, and pitman.

Having thus described my invention, I claim as new, and desire to secure by Letters Patent, the following:

1. The combination of a saw-gate and means for reciprocating the same with a rock shaft or shafts journaled to said gate and provided at their outer ends with short vertical cranks, the pins of which are pivoted in guide-blocks, and at the opposite end or ends with a horizontal lever adjustable by a pitman to a return crank or eccentric to give a swinging motion to the gate, as set forth.

2. In combination with a saw-gate, the inclined upper slides and pivoted blocks attached to the gate and reciprocating therein, the vertical lower slides, the rock-shafts journaled to said gate and carrying guide-blocks which reciprocate in the vertical slides, and the devices shown and described for oscillating said rock-shaft, arranged and operating substantially as specified.

3. In the mechanism of a gang-saw gate, the combination of crank B for reciprocating said gate, return-crank C, adapted to oscillate the same, the pitmen E and J, rock-shafts H, having slotted levers $e$ and cranks $e'$, for communicating the motion of said cranks B and C to the gate, with guides G G', adapted to receive the guide-blocks C' and $g$, all arranged to control the movement of the saws, substantially as set forth.

In testimony whereof I hereunto affix my signature in presence of two witnesses.

ALEXANDER RODGERS.

Witnesses:
 ISABELLA M. LAUGHLIN,
 FRED SUTCLIFFE.